United States Patent [19]

L'Eplattenier et al.

[11] 4,237,293
[45] Dec. 2, 1980

[54] METAL COMPLEXES OF AZOMETHINES

[75] Inventors: Francois L'Eplattenier, Therwil; André Pugin; Jost von der Crone, both of Riehen, all of Switzerland

[73] Assignee: Ciba-Geigy Corporation, Ardsley, N.Y.

[21] Appl. No.: 955,043

[22] Filed: Oct. 26, 1978

Related U.S. Application Data

[62] Division of Ser. No. 773,990, Mar. 3, 1977, Pat. No. 4,132,708, which is a division of Ser. No. 545,457, Jan. 30, 1975, Pat. No. 4,022,770.

[30] Foreign Application Priority Data

Feb. 6, 1974 [CH] Switzerland .................. 1625/74

[51] Int. Cl.³ ............... C07D 401/12; C07D 403/14; D06P 1/10
[52] U.S. Cl. .................... 546/7; 106/288Q; 106/292; 542/404; 542/415; 542/417; 542/419; 544/225; 544/226; 546/6; 548/106
[58] Field of Search .......... 544/226, 225; 546/6, 546/7; 548/106

[56] References Cited

U.S. PATENT DOCUMENTS

| 3,661,898 | 5/1972 | Dehaert et al. ............ 260/240 G |
| 3,867,404 | 2/1975 | von der Crone et al. ...... 260/240 G |
| 3,891,685 | 6/1975 | Hari et al. ............... 260/240 G |
| 3,892,750 | 7/1975 | Frey ..................... 260/326.1 |
| 4,016,157 | 4/1977 | Vuitel et al. ............... 544/226 |
| 4,111,947 | 9/1978 | L'Eplattenier ............... 544/225 |

Primary Examiner—Donald G. Daus
Assistant Examiner—James H. Turnipseed
Attorney, Agent, or Firm—Joseph F. DiPrima; Harry Falber

[57] ABSTRACT

Metal complexes of azomethines of the formula

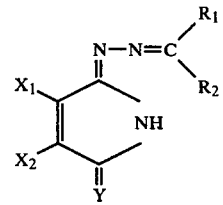

are useful for coloring plastics and lacquers in yellow to red shades of excellent fastness properties.

4 Claims, No Drawings

METAL COMPLEXES OF AZOMETHINES

This is a divisional of application Ser. No. 773,990, filed on Mar. 3, 1977, now U.S. Pat. No. 4,132,708, issued Jan. 2, 1979; which is a divisional of application Ser. No. 545,457, filed on Jan. 30, 1975, now U.S. Pat. No. 4,022,770, issued May 10, 1977.

The invention provides novel, useful metal complexes of azomethines and a process for their manufacture which comprises treating an azomethine of the formula

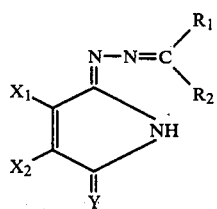
(I)

wherein $R_1$ represents a hydrogen atom, an alkyl or an aryl group, $R_2$ represents an isocyclic or a heterocyclic radical with a hydroxy group adjacent to the azomethine group, or $R_1$ and $R_2$ together with the carbon atom of the azomethine group represent a 5- or 6-membered heterocyclic ring which may be fused with benzene nuclei, each of $X_1$ and $X_2$ independently represents alkyl, cycloalkyl, aralkyl or aryl radicals or together $X_1$ and $X_2$ represent a fused carbocyclic or heterocyclic aromatic ring and Y represents the radical of a compound containing active methylene groups, of a heterocyclic amine or of a hydrazide, with an agent which donates bivalent metal.

In formula (I) as well as in the formulae listed hereinafter, reference is made to only one of all possible tautomeric or mesomeric structures.

Preferably, there are used as starting compounds azomethines of the formula

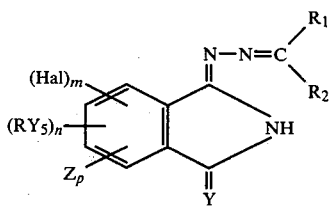
(II)

wherein $R_1$, $R_2$ and Y have the meanings already assigned to them, Hal represents a halogen atom, $Y_5$ represents an oxygen or a sulphur atom, $R_5$ represents an unsubstituted or a substituted alkyl, cycloalkyl or aryl group, Z represents a hydrogen atom, m, n and p are integers from 0 to 4 and the sum of m+n+p is 4.

Compounds of especial interest are azomethine metal complexes of the formula

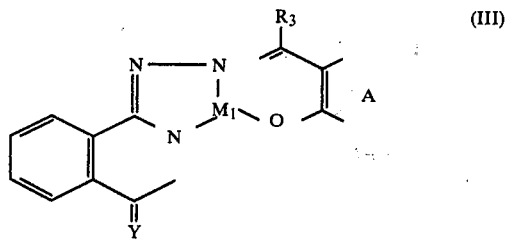
(III)

and, in particular, those of the formula III wherein Y represents the radical of a compound containing active methylene groups and especially the radical of the formula

(IV)

In the formulae (III) and (IV), A represents an isocyclic or a heterocyclic radical, $R_3$ represents a hydrogen atom or an alkyl group of 1 to 4 carbon atoms, $M_1$ represents a Ni, Cu, Co or Zn atom and a cyano group, $R_4$ represents an acyl, an alkoxycarbonyl, a carbamoyl or a sulphamoyl group or a radical of the formula

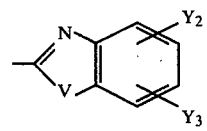

wherein V represents an oxygen or a sulphur atom or an imino group, $Y_2$ and $Y_3$ represent hydrogen or halogen atoms, alkyl or alkoxy groups of 1 to 4 carbon atoms or nitro groups.

Particularly preferred azomethine complexes are those of the formula

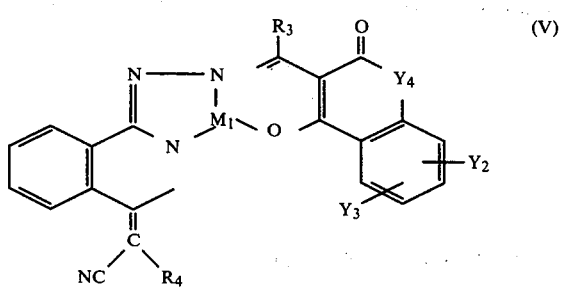
(V)

wherein $R_3$, $R_4$, $M_1$, $Y_2$ and $Y_3$ have the meanings already assigned to them and $Y_4$ represents an oxygen or a sulphur atom or a NH group.

Preferred metal complexes of azomethines are also those of the formula

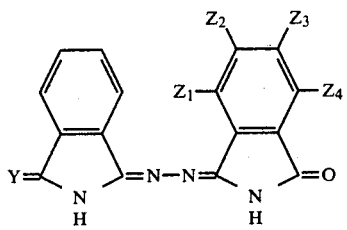

wherein Y has the meaning previously assigned to it, $Z_1$ and $Z_3$ represent hydrogen or halogen atoms, alkoxy or alkylmercapto groups of 1 to 6 carbon atoms, cycloalkyl groups of 5 to 6 carbon atoms, aralkoxy, aryloxy or arylmercapto groups, $Z_2$ and $Z_4$ represent hydrogen or halogen atoms, and one of the substituents $Z_1$ to $Z_4$ can also be a nitro group, and, in particular, those wherein Y represents a radical of the formula

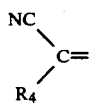

in which $R_4$ has the meaning previously assigned to it.

Preferred metal complexes of azomethines are also those of the formulae II and III wherein Y represents a radical of the formulae

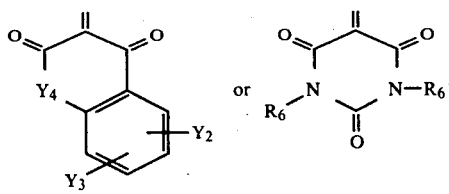

wherein $Y_2$, $Y_3$ and $Y_4$ have the meanings previously assigned to them and $R_6$ represents a hydrogen atom or an alkyl group of 1 to 4 carbon atoms or a phenyl radical which is unsubstituted or a phenyl radical which is substituted by halogen atoms, alkyl or alkoxy groups of 1 to 4 carbon atoms.

The azomethines used as starting materials (ligands) are in part known compounds. They are obtained by known processes, for example by (a) condensation of a compound of the formula

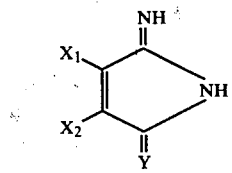

with a hydrazone of the formula

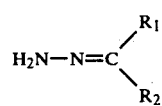 (VII)

or by (b) condensation of a compound of the formula

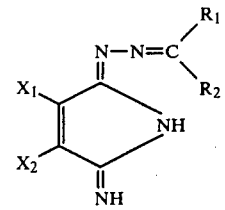

with a compound of the formula $H_2Y$, in which formulae $X_1$, $X_2$, $R_1$, $R_2$ and Y have the meanings previously assigned to them, or by (c) condensation of a hydrazone of the formula

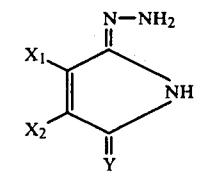

with an oxo compound of the formula

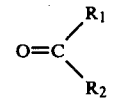

or the anil thereof of the formula

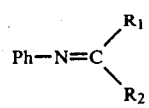

wherein Ph represents an unsubstituted or substituted phenyl radical.

The compounds of the formula (VI) are obtained by condensation of an amino-imine of the formula

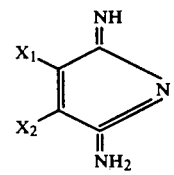

with a heterocyclic primary amine, a compound containing active methylene groups or with a hydrazide.

The compounds of the formula (VIII) are obtained by condensation of an amino-imine of the formula (IX) with a hydrazone of the formula (VII).

The compounds of the formula (VIIIa) are obtained by condensation of the compound of the formula (VI) with hydrazine.

The manner in which the ligands are manufactured can exert a substantial influence on their physical and colouristic properties and on their metal complexes.

Examples of amino-imines of the formula (IX) are:
2-amino-3,4-dichloro-pyrrolenine
2-amino-5-imino-3,4-dimethyl-pyrrolenine
2-amino-5-imino-3,4-diethyl-pyrrolenine
2-amino-5-imino-3,4-dicyclohexyl-pyrrolenine or
2-amino-5-imino-3,4-diphenyl-pyrrolenine.

Particular interest, however, attaches to the 1-amino-3-imino-isoindolenines of the formula

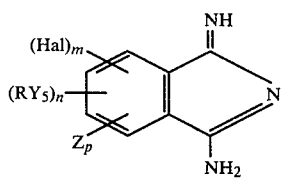

wherein Hal, RY, Z, m, n and p have the meanings previously assigned to them.

As examples there may be mentioned principally the unsubstituted 1-amino-3-imino-isoindolenine, also
4,5,6,7-tetrachloro-1-amino-3-imino-isoindolenine,
5,6-dichloro-1-amino-3-imino-isoindolenine,
4,5,7-trichloro-6-methoxy-1-amino-3-imino-isoindolenine
4,5,7-trichloro-6-ethoxy-1-amino-3-imino-isoindolenine
4,5,7-trichloro-6-phenoxy-1-amino-3-imino-isoindolenine
5,7-dichloro-4,6-dimethoxy-1-amino-3-imino-isoindolenine
5,7-dichloro-4,6-diphenoxy-1-amino-3-imino-isoindolenine
4,5,7-trichloro-6-methylmercapto-1-amino-3-imino-isoindolenine
4,5,7-trichloro-6-phenylmercapto-1-amino-3-imino-isoindolenine
1-amino-3-imino-4,5-benz-isoindolenine
4,5,6,7-tetraphenoxy-1-amino-3-imino-isoindolenine
5- or 6-methyl-1-amino-3-imino-isoindolenine
5- or 6-phenyl-1-amino-3-imino-isoindolenine
4- or 7-chloro-1-amino-3-imino-isoindolenine
5- or 6-chloro-1-amino-3-imino-isoindolenine
5,6-dichloro-1-amino-3-imino-isoindolenine
4- or 7-nitro-1-amino-3-imino-isoindolenine
5- or 6-nitro-1-amino-3-imino-isoindolenine
5- or 6-methoxy-1-amino-3-imino-isoindolenine
5- or 6-ethoxy-1-amino-3-imino-isoindolenine
5- or 6-phenoxy-1-amino-3-imino-isoindolenine
5- or 6-methylmercapto-1-amino-3-imino-isoindolenine
5- or 6-methylsulphonyl-1-amino-3-imino-isoindolenine
5- or 6-acetylamino-1-amino-3-imino-isoindolenine As further amino-imino-isoindolenines there may be cited:
1-amino-3-imino-4,7-dithia-4,5,6,7-tetrahydro-isoindolenine and 1-amino-3-imino-4,7-diaza-isoindolenine.

The cited 1-amino-3-imino-indolenines can be obtained, for example, from the corresponding phthalonitriles by treatment with liquid ammonia or from the dicarboxylic imides via the 1,3,3-trichloro-isoindolenines, which are subsequently reacted with ammonia.

The phthalonitriles which contain alkoxy, phenoxy or alkylmercapto groups can be obtained from the tetrachlorophthalonitrile by reaction with an alkali alcoholate, phenolate or mercaptide in a hydrophilic organic solvent.

The reaction of the cited 1-amino-3-iminoisoindolenines with heterocyclic amines to manufacture the compound of the formula (VI) is carried out desirably in the molar ratio 1:1 in a polar organic solvent, preferably an alcohol, such as methanol, ethanol, isobutanol or methyl cellosolve, at temperatures between 50° and 120° C.

The heterocyclic primary amines are preferably those in which the primary amino group is located directly at a 5- or 6-membered heterocyclic ring which can contain 3 nitrogen atoms and in addition oxygen and sulphur atoms. A benzene nucleus which may be substituted or unsubstituted can be fused to the heterocyclic parent nucleus. As examples there may be cited.

2-aminothiophene
2-aminothiazole
2-amino-5-nitrothiazole
2-amino-5-methylsulphonyl-thiazole
2-amino-5-cyanothiazole
2-amino-4-methyl-5-nitrothiazole
2-amino-4-methylthiazole
2-amino-4-phenylthiazole
2-amino-4-(4'-chloro)-phenylthiazole
2-amino-4-(4'-nitro)-phenylthiazole
3-aminopyrazole
3-amino-1-phenylpyrazole
3-aminoindazole
5-methylsulphonyl-2-aminothiazole
5-benzoyl-2-aminothiazole
2-aminoimidazole
4,5-dicyano-2-aminoimidazole
4,5-diphenyl-2-aminothiazole
2-amino-3,4-thiadiazole
2-amino-3,5-thiadiazole
3-amino-1,2,4-triazole
2-amino-3,4-oxadiazole
3-aminopyridine
2-aminopyridin-N-oxide
2-amino-benzthiazole
2-amino-6-chloro-benzthiazole
2-amino-6-methyl-benzthiazole
2-amino-6-methoxy-benzthiazole
2-amino-6-chloro-4-nitrobenzthiazole
2-amino-6-bromo-4-cyanobenzthiazole
2-amino-6-cyano-4-methylbenzthiazole
2-amino-6-methyl-4-nitrobenzthiazole
2-amino-6-methoxy-4-nitrobenzthiazole
2-amino-6-butoxy-4-chlorobenzthiazole
2-amino-4-chloro-5-methoxybenzthiazole
2-amino-4-bromo-6-methoxybenzthiazole
2-amino-4,6-dichlorobenzthiazole
2-amino-4,6-dibromobenzthiazole
2-amino-4-methyl-6-(trifluoromethyl)-benzthiazole
2-amino-4-methyl-6-propionylbenzthiazole
2-amino-4-chloro-6-(methylsulphonyl)-benzthiazole
3-aminobenzisothiazole
3-amino-5-chloro-benzisothiazole
2-amino-3-cyano-tetrahydrobenzthiophene
2-amino-benzimidazole
2-amino-6-chloro-benzimidazole
2-amino-6-bromo-benzimidazole
2-amino-6-methyl-benzimidazole
2-amino-6-methoxy-benzimidazole
2-amino-6-ethoxy-benzimidazole
2-amino-6-methylsulphonyl-benzimidazole
2-amino-6-acetylamino-benzimidazole Instead of reacting the compounds of the formulae (VIII) or (IX) with amines, it is also possible to react them with compounds containing active methylene groups.

The compounds containing active methylene groups can be classified as follows:

(a) Substituted acetonitriles, in particular those of the $R_4CH_2CN$, wherein $R_4$ has the meaning already assigned to it.

Examples of simply substituted acetonitriles are: malonitrile cyanoacetic acid methyl, ethyl, propyl or butyl ester
cyanoacetamide
cyanoacetic acid methylamide or ethylamide
cyanoacetic acid phenylamide
α-cyano-dimethyl ketone
cyanomethyl ethyl ketone
α-cyanoacetophenone
phenylacetonitrile
phenylsulphonylacetonitrile
phenylsulphamoylacetonitrile
sulphamoyl.

Examples of heterocyclic substituted acetonitriles are:
2-cyanomethyl-oxazole
2-cyanomethyl-thiazole
2-cyanomethyl-imidazole
2-cyanomethyl-1,2,3-triazole
2-cyanomethyl-4-hydroxy-quinazoline
2-cyanomethyl-benzoxazole
2-cyanomethyl-benzthiazole
2-cyanomethyl-benzimidazole
2-cyanomethyl-5-chlorobenzimidazole
2-cyanomethyl-5-nitrobenzimidazole
2-cyanomethyl-5,6-dimethylimidazole
2-cyanomethyl-5-ethoxyimidazole
2-cyanomethyl-5,6-dichloroimidazole
2-cyanomethyl-5-methoxyimidazole
2-cyanomethyl-dihydro-quinazolone-4
and the compound of the formula

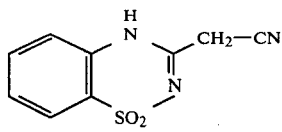

(b) Pyridines, quinolines, cumarins and pyrimidines, for example:
4-methyl-2,6-dioxo-tetrahydro-pyridine
4-methyl-5-cyano-2,6-dioxo-tetrahydro-pyridine
4-methyl-5-carbamoyl-2,6-dioxo-tetrahydro-pyridine
4-methoxycarbonyl-2,6-dioxo-tetrahydro-pyridine
1,4-dimethyl-2,6-dioxo-tetrahydro-pyridine
1-phenyl-4-methyl-2,6-dioxo-tetrahydro-pyridine
4,6-dioxo-tetrahydro-pyrimidine
1,3-dioxo-tetrahydro-isoquinoline
4-hydroxycumarin (c) Barbituric acid and derivatives, for example:
barbituric acid
methyl-, ethyl- or phenylbarbituric acid
2-thiobarbituric acid
2-iminobarbituric acid
1-phenylbarbituric acid
1,3-dimethylbarbituric acid
1,3-diphenylbarbituric acid
1-methylbarbituric acid (d) Pyrazolones, for example:
3-methyl-pyrazolone-5
1-phenyl-3-methyl-pyrazolone-5
3-methoxycarbonyl-pyrazolone-5
1-phenyl-3-carbamoyl-pyrazolone-5

(e) Imidazoles, oxazoles, isoxazoles and thiazoles, for example:
oxazolone-5
2-methyl-oxazolone-5
2-phenyl-oxazolone-5
isoxazolone-5
3-methyl-isoxazolone-5
3-phenyl-isoxazolone-5
imidazolidin-2,4-dione
3-methyl-benzthiazoline.

The condensation of the compounds of the formula (VIII) or (IX) with the compounds containing active methylene groups is effected desirably at temperatures between 10° and 110° C. in an organic solvent, expediently in a hydrophilic organic solvent, especially in an aliphatic alcohol, for example methanol, propanols, butanols, glycols and glycol monoethers or in acetic acid, if appropriate in mixtures with water.

Instead of compounds containing active methylene groups, it is also possible to condense hydrazides, for example the hydrazides of aliphatic monocarboxylic acids containing 2 to 4 carbon atoms or, in particular, the hydrazides of the formula

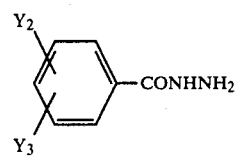

wherein $Y_2$ and $Y_3$ have the meanings previously assigned to them, with the imines of the formulae VIII or IX.

The condensation of the hydrazides with the compounds of the formulae VIII or IX is desirably carried out in water or in an organic solvent at elevated temperature, preferably between 50° C. and the boiling point of the solvent employed. Examples of solvents are: water, alcohol, glacial acetic acid, dioxan, dimethyl formamide, N-methylpyrrolidone, butylrolacetone, glycol monomethyl etheer, xylene, chlorobenzene, o-dichlorobenzene, nitrobenzene or mixtures thereof.

The reaction according to process (a) of the compounds of the formula (VI) with the hydrazones of the formula VII, preferably with those of the formula

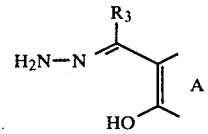

wherein A and $R_3$ have the indicated meanings, is carried out at temperatures between 50° and 130° C. in an organic solvent and diluent.

Suitable solvents and diluents are polar organic solvents, above all those which are miscible with water, such as alcohols, N,N-dimethyl formamide, N,N-diethyl formamide, N,N-diethyl acetamide, N,N-dimethyl acetamide, N-methylpyrrolidone, glacial acetic acid, formic acid, glycol monomethyl ether, glycol monoethyl ether or mixtures thereof.

The hydrazones, the majority of which are known compounds, are obtained by reaction of the corresponding oxo compound of the formula

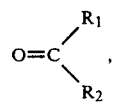

or aldimines thereof of the formula

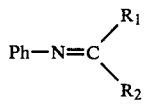

wherein $R_1$ and $R_2$ have the indicated meanings and Ph represents an unsubstituted or a substituted phenyl radical, in particular those of formula

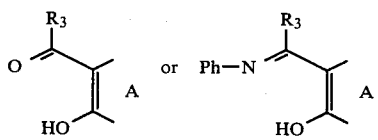

wherein $R_3$ and Ph have the indicated meanings, by known processes with hydrazine hydrate.

The oxo compounds of the formula

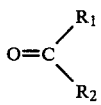

or the aldimines thereof can belong to both the aromatic and the heterocyclic class.

Particularly interesting oxo compounds are those of the formula

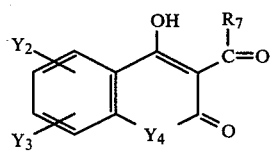

wherein $Y_2$, $Y_3$ and $Y_4$ have the meanings already assigned to them, $R_7$ represents a hydrogen atom or a methyl group, and especially the hydroxyquinolines or hydroxycumarins of the formulae.

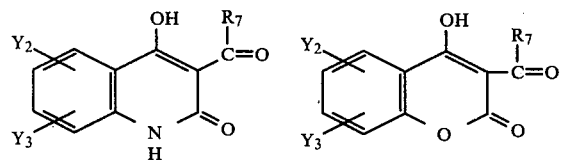

wherein $R_7$, $Y_2$ and $Y_3$ have the indicated meanings.

Particular attaches also to the compounds of the following formulae

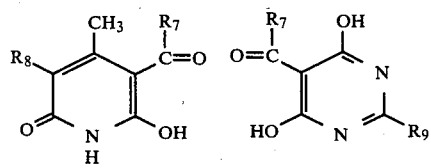

wherein $R_7$ has the meaing previously assigned to it, $R_8$ represents a cyano, alkoxycarbonyl group or a carbamoyl group and $R_9$ represents a hydrogen atom, an alkyl, aryl or a hydroxy group,

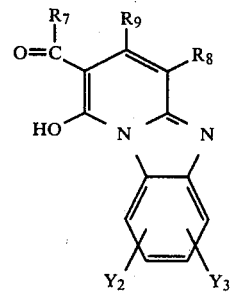

wherein $Y_2$, $Y_3$, $R_7$ and $R_8$ have the meanings assigned to them hereinbefore,

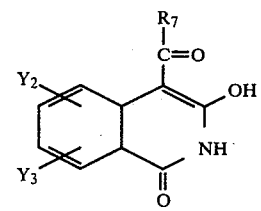

wherein $Y_2$, $Y_3$ and $R_7$ have the meanings assigned to them hereinbefore, and also hydroxynaphthaldehydes of the formula

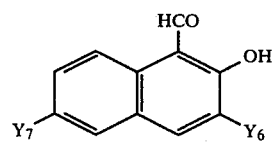

wherein $Y_6$ represents a hydrogen atom, a carboxy or a carbamoyl group, an alkoxycarbonyl or alkylcarbamoyl group containing 2 to 6 carbon atoms, an phenylcarbamoyl group which is unsubstituted or which is substituted in the phenyl moiety by halogen atoms or alkyl or alkoxy groups of 1 to 4 carbon atoms, $Y_7$ represents a hydrogen or a halogen atom, a methoxy, nitro or cyano group, or pyrazoles of the formula

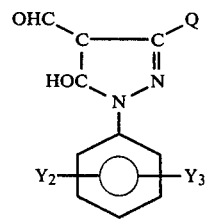

wherein $Y_2$ and $Y_3$ have the indicated meanings, Q represents a methyl group or an alkoxycarbonyl group containing 2 to 5 carbon atoms or a carbamoyl group.

The following aldehydes or ketones may be cited as examples:
(1) o-hydroxybenzaldehydes:
salicylaldehyde
4-chloro-2-hydroxybenzaldehyde
5-chloro-2-hydroxybenzaldehyde
3-nitro-2-hydroxybenzaldehyde
5-nitro-2-hydroxybenzaldehyde
3,5-dichloro-2-hydroxybenzaldehyde
3,5-dibromo-2-hydroxybenzaldehyde 5-phenylazo-2-hydroxybenzaldehyde
5-(2'-chloro-phenylazo)-2-hydroxybenzaldehyde
5-(2',5'-dichloro-phenylazo)-2-hydroxybenzaldehyde
5-(2'-methyl-phenylazo)-2-hydroxybenzaldehyde
5-(2'-methoxy-phenylazo)-2-hydroxybenzaldehyde
5(2'-methoxy-4'-nitro-phenylazo)-2-hydroxybenzaldehyde
5-(2'-methoxy-5'-carbamoyl-phenylazo)-2-hydroxybenzaldehyde (2) Hydroxynaphthaldehydes:
2-hydroxynaphthaldehyde
6-bromo-2-hydroxynaphthaldehyde
5-nitro-2-hydroxynaphthaldehyde
2-hydroxy-3-carboxy-naphthaldehyde
2-hydroxy-3-methoxycarbonyl-naphthaldehyde
2-hydroxy-3-phenylcarbamoyl-naphthaldehyde
2-hydroxy-3-(4'-chlorophenylcarbamoyl)-naphthaldehyde
2-hydroxy-3-(4'-chloro-2'-methylphenylcarbamoyl-naphthaldehyde
2-hydroxy-3-(2',5'-dimethoxy-3'-chloro-phenylcarbamoyl-napthaldehyde
2-hydroxy-6-bromo-3-carboxynaphthaldehyde
2-hydroxy-6-bromo-3-phenylcarbamoylnaphthaldehyde.

(3) Heterocyclic aldehydes and ketones:
2,6-dihydroxy-4-methyl-5-cyano-3-pyridinaldehyde
2,6-dihydroxy-4-methyl-5-carbamoyl-3-pyridinaldehyde
2,4-dihydroxy-3-quinoline aldehyde
5-chloro-2,4-dihydroxy-3-quinoline aldehyde
6-chloro-2,4-dihydroxy-3-quinoline aldehyde
7-chloro-2,4-dihydroxy-3-quinoline aldehyde
8-chloro-2,4-dihydroxy-3-quinoline aldehyde
6,8-dichloro-2,4-dihydroxy-3-quinoline aldehyde
7,8-dichloro-2,4-dihydroxy-3-quinoline aldehyde
6-methyl-2,4-dihydroxy-3-quinoline aldehyde
7-methyl-2,4-dihydroxy-3-quinoline aldehyde
8-methyl-2,4-dihydroxy-3-quinoline aldehyde
6-chloro-8-methyl-2,4-dihydroxy-3-quinoline aldehyde
2,4-dihydroxy-3-acetyl-quinoline
2,4-dihydroxy-3-acetyl-6-methyl-quinoline
2,4-dihydroxy-3-acetyl-6-chloro-quinoline
3-hydroxy-isoquinoline-4-aldehyde
5-formyl-bartituric acid
2-methyl-4,6-dihydroxy-5-pyrimidine aldehyde
2-phenyl-4,6-dihydroxy-5-pyrimidine aldehyde
4-hydroxy-3-quinaldine aldehyde
6-chloro-4-hydroxy-3-quinaldine aldehyde
6-methoxy-4-hydroxy-3-quinaldine aldehyde
4-hydroxycumarin-3-aldehyde
6-methyl-4-hydroxycumarin-3-aldehyde
6-methoxy-4-hydroxycumarin-3-aldehyde
6-chloro-4-hydroxycumarin-3-aldehyde
5,7-dimethyl-6-chloro-4-hydroxycumarin-3-aldehyde
1-phenyl-3-methyl-4-formyl-pyrazolone-5
1-phenyl-3-carboxy-4-formyl-pyrazolone-5
1-phenyl-3-methoxycarbonyl-4-formyl-pyrazolone-5
1-phenyl-3-ethoxycarbonyl-4-formyl-pyrazolone-5
1-(2'-chlorophenyl)-3-methyl-4-formyl-pyrazolone-5
1-(4'-chlorophenyl)-3-methyl-4-formyl-pyrazolone-5
1-(2'-methylphenyl)-3-methyl-4-formyl-pyrazolone-5
1-(4'-methylphenyl)-3-methyl-4-formyl-pyrazolone-5
1-phenyl-3-carbamoyl-4-formyl-pyrazolone-5

As hydrazones of the formula (VII) it is also possible to use those of the formula

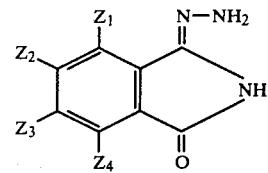

wherein $Z_1$ to $Z_4$ have the meanings previously assigned to them. These are obtained by reaction of hydrazine with an isoindolinone of the formula

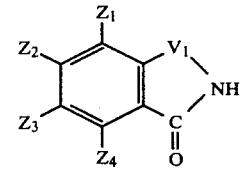

wherein $Z_1$ to $Z_2$ have the meanings previously assigned to them, $V_1$ represents a group of the formula

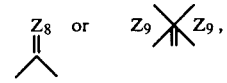

wherein $Z_8$ represents an imino or a thio group and both symbols $Z_9$ represents halogen atoms, alkoxy or secondary amino groups As starting materials there are preferably used 3-imino-isoindolinone or 3,3'-dialkoxy-iminoisoindolinones of the formula

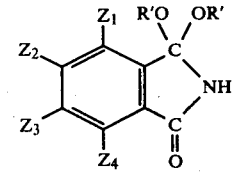

wherein $Z_1$ to $Z_4$ have the meanings previously assigned to them and R' represents an alkyl group of 1 to 4 carbon atoms. Those starting materials in which $Z_1$ to $A_4$ represent chlorine atoms or hydrogen atoms are known, and those in which $Z_1$ and $Z_3$ represent alkoxy, cycloalkoxy, aralkoxy, aryloxy, alkylthio or arylthio groups and $Z_2$ and $Z_4$ represent chlorine atoms can be obtained by reaction of an ammonium salt or ester of tetrachloro-o-cyanobenzoic acid in a hydrophilic organic solvent with a compound of the formula $Z_1M_3$, wherein $Z_1$ has the meaning previously assigned to it and $M_3$ represents an alkali metal atom, and, if necessary, esterifying the resultant product.

Examples of isoindolinones are:
3,3-dimethoxy-4,5,6,7-tetrachloro-isoindolinone
3,3-dimethoxy-4,5,6,7-tetrabromo-isoindolinone
3,3,6-trimethoxy-4,5,7-trichloro-isoindolinone
3,3-dimethoxy-4,5,7-trichloro-6-butoxy-isoindolinone
3,3-dimethoxy-4,5,7-trichloro-6-phenoxy-isoindolinone
3,3-dimethoxy-4,5,7-trichloro-6-(p-chlorophenoxy)-isoindolinone
3,3-dimethoxy-4,5,7-trichloro-6-(o-methylphenoxy)-isoindolinone 3,3-dimethoxy-4,5,7-trichloro-6-methylmercapto-isoindolinone
3,3-dimethoxy-4,5,7-trichloro-6-ethylmercapto-isoindolinone
3,3,4,6-tetramethoxy-5,7-dichloro-isoindolinone
3,3-dimethoxy-4,7-dichloro-isoindolinone
3,3-dimethoxy-4-nitro-isoindolinone
3,3-dimethoxy-5-nitro-isoindolinone
3,3-dimethoxy-4-fluoro-isoindolinone
3,3-dimethoxy-7-iodo-isoindolinone
3-imino-isoindolinone
5-chloro-3-imino-isoindolinone
5,6-dichloro-3-imino-isoindolinone The ligands can also be manufactured by process modification (b), i.e. by condensation of a compound of the formfula (VIII) with a compound of the formula $H_2Y$.

It is preferred to use as starting material a compound of the formula

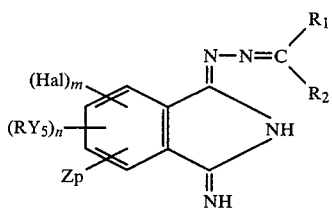

wherein the symbols have the meanings previously assigned to them. As compounds of the formula $H_2Y$ it is desirable to use the compounds containing active methylene groups, heterocyclic amines or hydrazides cited hereinbefore. The reaction is desirably carried out in a polar organic solvent at temperatures between 50° and 120° C.

Compounds of the formula

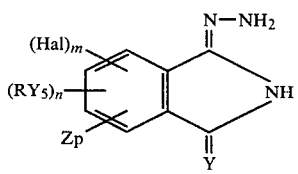

wherein the symbols have the meansings previously assigned to them, are preferably used as starting materials. The aldehydes or ketones or anils thereof cited hereinbefore can be preferably used as oxo compounds. The reaction is carried out preferably at temperatures between 50° and 130° C. in the above mentioned organic solvents and diluents.

Since the ligands are sparingly soluble as a rule in the solvents used for the reaction, it is possible to isolate them easily by filtration. Any impurities can be removed by washing off.

The ligands are converted into the metal complexes by treating them with agents which donate bivalent metals, for example with salts of zinc, cadmium, maganese, cobalt, iron, but especially for copper and nickel or mixtures of such metals. Preferably, the formiates, acetates or stearates of these metals are used. The metallising takes place, for example, in water, if appropriate with the addition of a dispersant, but desirably in one of the solvents cited hereinbefore.

A further embodiment of the process according to the invention consists in (a) condensing a hydrazone of the formula VII with a compound of the formula VI (single step process I), or (b) condensing a compound of the formula VIII with a compound of the formula $H_2Y$, wherein Y has the indicated meaning (single step process II), or (c) condensing a hydrazine of the formula VIIIa with an oxo compound of the formula

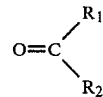

or the anil thereof (single step process III), in the presence of an agent which donates a bivalent metal.

These different metallising processes are able to result in metal complexes with different physical and colouristic properties. In principle, each of the single step processes I, II and III yields the same metal complexes as the metallising of the ligands obtained according to processes (a), (b) and (c).

The novel colourants constitute useful pigments which, in finely divided form, may be used for pigmenting organic material of high molecular weight, for example cellulose ethers and esters, polyamides and polyurethanes or polyesters, acetyl cellulose, nitrocellulose, natural resins or synthetic resins, such as polymerisation or condensation resins, for example aminoplasts, in particular urea and melamine/formaldehyde resins, alkyl resins, phenolic plastics, polycarbonates, polyolefins, such as polystyrene, polyvinyl chloride, polyethylene, polypropylene, polyacrylonitrile, polyacrylic esters, rubber, casein, silicon and silicone resins, individually or in mixtures.

It is immaterial whether the cited materials of high molecular weight are in the form of plastics, melts or in the form of spinning solutions, lacquers or printing inks. Depending on the use to which they are put, it is advantageous to use the novel pigments as toners or in the form of preparations.

The resultant colourations are characterised by good general pigment properties, especially by good fastness to light and migration and weathering, and frequently by great brilliance of shade which is surprising for metal complexes and by high colour strength.

The following Examples illustrate the invention, the parts and percentages being by weight unless otherwise stated.

EXAMPLE 1

A mixture of 15.15 g (0.05 mole) of 1-cyano-carbanilidomethylene-3-hydrazinoisoindoline (prepared from 1-cyanocarbanilidomethylene)-3-imino-isoindoline and hydrazine) and 9.45 g (0.05 mole) of 3-formyl-2,4-dihydroxyquinoline is stirred in 200 ml of glacial acetic acid for 2 hours at 100° C. The reaction mixture is filtered off hot. The filter residue is thoroughly washed with glacial acetic acid and ethanol and dried at 100° C in vacuo. Yield: 21.5 g (90.7% of theory) of a yellowish orange pigment of the composition $C_{27}H_{18}N_6O_3$ and of the formula

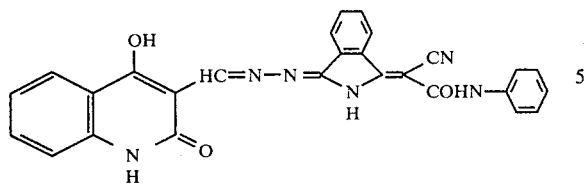

(only one of the possible isomeric or tautomeric forms has been considered). The reaction of the resultant ligand with nickel acetate.4H$_2$O (theory + 10% surplus) in 600 ml of methylcellosolve over the course of 3 hours at 110° C leads to a 1:1 Ni$^{2+}$ complex which colours PVC and lacquers in orange red shades of excellent fastness to light, weathering and migration.

| Microanalysis: | C$_{27}$H$_{16}$N$_6$NiO$_3$(MG 531) | | | |
|---|---|---|---|---|
| | C | H | N | Ni |
| % estimated | 61.05 | 3.04 | 15.82 | 11.05 |
| % found | 60.6 | 3.1 | 16.0 | 10.8 |

Instead of using methyl cellosolve, it is also possible to use carbitols, glycols, dimethyl formamide or dimethyl sulphoxide for the metallising. If the metal complexes are not dried at a higher temperature than 100° C in vacuo, they contain normally 0.5 to 2 moles of water of crystallisation.

The 1:1 metal complexes of the formula given below (only one of the possible isomeric or tautomeric forms has been considered for the sake of simplicity), in which M$_1$, A and X have the meanings indicated in Table 1, are synthesised according to the process of Example 1. The starting materials can be manufactured by known methods.

TABLE I

| Example | M$_1^{2+}$ | X | A | Shade in PVC |
|---|---|---|---|---|
| 2 | Ni$^{2+}$ | Cl | (NH-phenyl diketone) | scarlet |
| 3 | Ni$^{2+}$ | H | (O-phenyl diketone) | scarlet |
| 4 | Ni$^{2+}$ | H | (pyrazole CONH$_2$) | red |
| 5 | Ni$^{2+}$ | H | (OH-pyridone) | orange |
| 6 | Cu$^{2+}$ | " | " | yellowish brown |

EXAMPLE 7

A mixture of 15.15 g (0.05 mole) of 1-cyano-carbanilidomethylene)-3-hydrazinoisoindoline (prepared from 1-(cyanocarbanilidomethylene)-3-imino-isoindoline and hydrazine) and 9.45 g (0.05 mole) of 3-formyl-2,4-dihydroxyquinoline, to which is then added 13.75 g (0.055 mole) of nickel acetate. 4H$_2$O, is stirred in 500 ml of methyl cellosolve for 3 hours at 110° C. The reaction mixture is filtered off hot. The filter residue is thoroughly washed with methyl cellosolve and ethanol and dried at 80° C. in vacuo. Yield: 10.5 g 838.9% of theory) of an orange red nickel complex of the same composition (+0.5 mole of water of crystallisation) and pigment properties as in Example 1.

| Microanalysis: | C$_{27}$H$_{16}$N$_6$NiO$_3$ . 0.5 H$_2$O (MG 540) | | | |
|---|---|---|---|---|
| | C | H | N | Ni |
| % estimated | 60.0 | 3.1 | 15.55 | 10.8 |
| % found | 59.8 | 3.2 | 15.3 | 10.8 |

Instead of using methyl cellosolve it is also possible to use carbitols, glycols, dimethyl formamide or dimethyl sulphoxide. If the metal complexes are not dried at a temperature higher than 100° C. in vacuo they normally still contain 0.5 to 2 moles of water of crystallisation.

The metal complexes of the formula given below (only one of the possible tautomeric or isomeric forms has been considered), in which M$_1$, Y, R$_3$ and A have the meanings given in Table II, are synthesised according to the single step process of Example 7. Some of the starting products are known or can be manufactured by known methods. Column 6 indicates the ratio of metal to ligand.

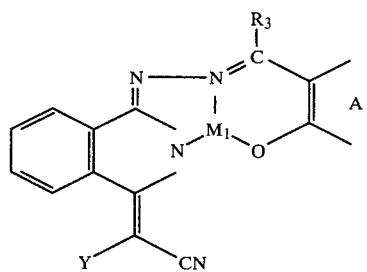

| Example | $M_1^{2+}$ | Y | $R_3$ | A (O-C(CH₃)=C(CH₃)-) | $M_1/L$ | Shade in PVC |
|---|---|---|---|---|---|---|
| 8 | $Cu^{2+}$ | —CONH—C₆H₅ | H | (2-NH-phenyl carbonyl methyl) | 1/1 | yellowish brown |
| 9 | $Ni^{2+}$ | —CONH—C₆H₄—Cl (4-Cl) | H | " | 1/1 | scarlet |
| 10 | $Ni^{2+}$ | —CONH—C₆H₄—Cl (2-Cl) | H | " | 1/2 | yellowish orange |
| 11 | $Ni^{2+}$ | —CONH—C₆H₃—Cl₂ (2,4-Cl) | H | " | 1/1 | orange |
| 12 | $Ni^{2+}$ | (2-aminophenyl-carbonyl-2-imidazoline) | H | " | 1/1 | red |
| 13 | $Cu^{2+}$ | " | H | " | 1/1 | brown |
| 14 | $Ni^{2+}$ | —CONH—C₆H₃(CH₃)₂ (2,4-diCH₃) | H | " | 1/1 | orange red |
| 15 | $Cu^{2+}$ | " | H | " | 1/1 | brown |
| 16 | $Ni^{2+}$ | —CONH—C₆H₄—OCH₃ (4-OCH₃) | H | " | 1/1 | red |
| 17 | $Ni^{2+}$ | —CONH—C₆H₅ | H | (2-NH-4-methylphenyl carbonyl methyl) | 1/1 | scarlet |

-continued

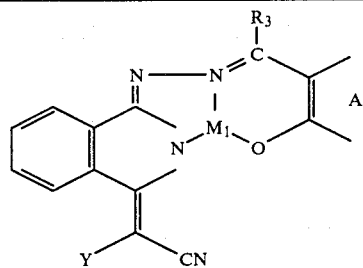

| Example | $M_1^{2+}$ | Y | $R_3$ | 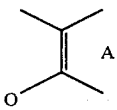 A | $M_1/L$ | Shade in PVC |
|---|---|---|---|---|---|---|
| 18 | $Ni^{2+}$ | —CONH—⌬—Cl | H | " | 1/2 | red |
| 19 | $Ni^{2+}$ | —CONH—⌬(Cl,Cl) | H | " | 1/1 | orange |
| 20 | $Ni^{2+}$ | —CONH—⌬—OCH$_3$ | H | " | 1/1 | red |
| 21 | $Ni^{2+}$ | (benzamide-pyrimidinyl) | H | " | 1/1 | reddish brown |
| 22 | $Ni^{2+}$ | —CONH—⌬ | H | (2-chloroanilide structure) | 1/1 | orange |
| 23 | $Cu^{2+}$ | " | H | " | 1/1 | brown |
| 24 | $Ni^{2+}$ | —CONH—⌬(2-Cl) | H | " | 1/1 | yellowish orange |
| 25 | $Cu^{2+}$ | " | H | " | 1/1 | yellowish brown |
| 26 | $Ni^{2+}$ | —CONH—⌬—OCH$_3$ | H | " | 1/1 | red |
| 27 | $Ni^{2+}$ | —CONH—⌬—Cl | H | " | 1/1 | orange |
| 28 | $Ni^{2+}$ | (benzamide-pyrimidinyl) | H | " | 1/1 | reddish brown |

-continued
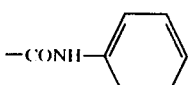
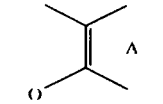
| Example | M₁²⁺ | Y | R₃ | A (O-structure) | M₁/L | Shade in PVC |
|---|---|---|---|---|---|---|
| 29 | Ni²⁺ | —CONH—C₆H₅ | H | 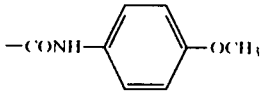 | 1/1 | scarlet |
| 30 | Ni²⁺ | —CONH—C₆H₄—OCH₃ | H | " | 1/1 | red |
| 31 | Ni²⁺ | —CONH—C₆H₄—Cl | H | " | 1/1 | orange |
| 32 | Ni²⁺ | " | H | 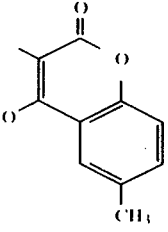 | 1/1 | orange |
| 33 | Ni²⁺ | —CONH—C₆H₅ | H | " | 1/1 | orange |
| 34 | Ni²⁺ | —CONH—C₆H₄—OCH₃ | H | " | 1/1 | red |
| 35 | Ni²⁺ | —CONH—C₆H₄—Cl | H | 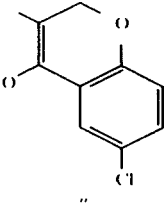 | 1/1 | orange |
| 36 | Ni²⁺ | —CONH—C₆H₅ | H | " | 1/1 | orange |
| 37 | Ni²⁺ | —CONH—C₆H₄—OCH₃ | H | " | 1/1 | red |

-continued

[Structure: complex with R3, N=N, C, M1, A, O, N, phenyl ring, Y, CN groups]

[Structure for A group: isopropenyl-O-A fragment]

| Example | $M_1^{2+}$ | Y | $R_3$ | O―A | $M_1/L$ | Shade in PVC |
|---|---|---|---|---|---|---|
| 38 | $Ni^{2+}$ | ―CONH―phenyl | H | [pyrazolone with CONH2, N-phenyl] | 1/1 | red |
| 39 | $Ni^{2+}$ | " | H | [pyrimidine with OH, OH, O] | 1/1 | red |
| 40 | $Ni^{2+}$ | ―CONH―phenyl | $CH_3$ | [quinolinone structure with NH, O] | 1/1 | red |
| 41 | $Cu^{2+}$ | " | $CH_3$ | " | 1/1 | brown |

EXAMPLE 42

A mixture of 14.4 g (0.05 mole) of 1-(cyano-carbanilidomethylene)-3-imino-isoindoline and 10.15 g (0.05 mole) of 3-formyl-2,4-dihydroxyquinoline-hydrazone (prepared by known methods) is stirred in 200 ml of glacial acetic acid for 1 hour at 95° C. The reaction mixture is filtered off hot. The filter residue is thoroughly washed with glacial acetic acid and ethanol and dried at 100° C. in vacuo. Yield: 21.3 g (89.8% of theory) of an orange pigment of the same composition ($C_{27}H_{18}N_6O_3$) as the ligand in Example 1, but of other physical properties, such as UV, VIS, IR spectra and fragmentation in the mass spectrum. The reaction of the resultant ligand with nickel acetate.$4H_2O$ (theory + 10% surplus) in 600 ml of methyl cellosolve over the course of three hours at 110° C. leads, as in Example 1, to a 1:1 $Ni^{2+}$ complex of the composition $C_{27}H_{16}N_6NiO_3$, which colours PVC and lacquers in claret shades of good fastness to light and migration.

Instead of methyl cellosolve it is also possible to use carbitols, glycols, dimethyl formamide or dimethyl sulphoxide for the metallising.

If the metal complexes are not dried at a temperature higher than 100° C. in vacuo, they normally still contain 0.5 to 2 moles of water of crystallisation. The metal complexes of the formula given below (only one of the possible isomeric or tautomeric forms has been considered for the sake of simplicity), in which $M_1$, Y, $R_3$ and A have the meanings given in Table III, are synthesised according to the process of Example 42. Some of the starting materials are known or they can be manufactured by known methods. Column 6 indicates the ratio of metal to ligand.

TABLE III $$\text{structure shown: benzene ring fused with C=N-N=N-M}_1\text{-O-C(A)=C(R}_3\text{)-C, and N-C=Y on the lower side}$$

| Example | $M_1^{2+}$ | Y | $R_3$ | (A, O structure) | $M_1$/L | Shade in PVC |
|---------|-----------|---|-------|------------------|---------|--------------|
| 43 | $Ni^{2+}$ | =C(CN)(CN) | H | methyl-C(=O)-C=C(O−)-C₆H₄-NH (o-aminophenyl ketone enol) | 1/1 | brown |
| 44 | $Cu^{2+}$ | " | H | " | 1/1 | brown |
| 45 | $Ni^{2+}$ | =C(CN)(CONH₂) | H | " | 1/1 | red |
| 46 | $Cu^{2+}$ | " | H | " | 1/1 | brown |
| 47 | $Ni^{2+}$ | =C(CN)(CONHCONH₂) | H | " | 1/1 | yellowish brown |
| 48 | $Cu^{2+}$ | " | H | " | 1/1 | brown |
| 49 | $Cu^{2+}$ | =C(CN)(CONH−C₆H₅) | H | " | 1/1 | reddish brown |
| 50 | $Ni^{2+}$ | =C(CN)(CONH−C₆H₄−Cl) | H | " | 1/1 | claret |
| 51 | $Cu^{2+}$ | " | H | " | 1/1 | claret |
| 52 | $Ni^{2+}$ | =C(CN)(benzimidazol-2-yl) | H | " | ½ | claret |
| 53 | $Cu^{2+}$ | " | H | " | 1/1 | claret |
| 54 | $Ni^{2+}$ | =C with (C=O)NH-C₆H₄-(C=O) ring | H | " | 1/1 | claret |
| 55 | $Cu^{2+}$ | " | H | " | 1/1 | violet |
| 56 | $Ni^{2+}$ | =C with (C=O)NH-C₆H₃(Cl)-(C=O) ring | H | " | 1/1 | violet |

TABLE III-continued

| Example | $M_1^{2+}$ | Y | $R_3$ | A with O= group | $M_1/L$ | Shade in PVC |
|---|---|---|---|---|---|---|
| 57 | $Ni^{2+}$ | =C(C(=O)NH-C₆H₄-)(C=O) | H | 2-(NH-C₆H₃-Cl)-substituted β-ketoenolate | 1/1 | claret |
| 58 | $Cu^{2+}$ | " | H | " | 1/1 | red |
| 59 | $Ni^{2+}$ | =C(CN)(CONH₂) | H | 2-(NH-C₆H₃-Cl₂) β-ketoenolate | 1/1 | yellowish orange |
| 60 | $Cu^{2+}$ | " | " | " | 1/1 | brown |
| 61 | $Ni^{2+}$ | " | H | 1-methyl-2-naphtholate | 1/1 | red |
| 62 | $Cu^{2+}$ | " | H | " | 1/1 | brown |
| 63 | $Ni^{2+}$ | " | H | " | 1/1 | red |
| 64 | $Cu^{2+}$ | " | H | 1-methyl-3-COOH-2-naphtholate | 1/1 | brown |
| 65 | $Co^{2+}$ | " | H | " | 1/1 | claret |
| 66 | $Ni^{2+}$ | =C(CN)(CONH-C₆H₅) | H | " | 1/1 | reddish brown |
| 67 | $Cu^{2+}$ | " | H | " | 1/1 | brown |
| 68 | $Ni^{2+}$ | =C(C(=O)NH-C₆H₄-)(C=O) | H | " | 1/1 | brown |
| 69 | $Cu^{2+}$ | " | H | " | 1/1 | brown |

TABLE III-continued $$\underset{Y}{\underset{\|}{\overset{\|}{\underset{N}{\bigcirc}}}}\overset{N-N}{\underset{M_1}{\bigvee}}\overset{R_3}{\underset{O}{\bigvee}}A$$

| Example | $M_1^{2+}$ | Y | $R_3$ | $\underset{O}{\overset{A}{\bigvee}}$ | $M_1/L$ | Shade in PVC |
|---|---|---|---|---|---|---|
| 70 | $Cu^{2+}$ | =C(CN)(CONH₂) | H | 1-methyl-3-hydroxy-naphthalene-2-CONH-(4-Cl-C₆H₄) | 1/1 | brown |
| 71 | $Ni^{2+}$ | " | H | " | 1/1 | claret |
| | | | | 4,5-dimethyl-3-CN-2,6-dioxo-pyridine | | |
| 72 | $Cu^{2+}$ | " | H | " | 1/1 | brown |
| 73 | $Ni^{2+}$ | " | $CH_3$ | acetoacetanilide-type | 1/1 | red |
| 74 | $Cu^{2+}$ | " | $CH_3$ | " | 1/1 | brown |
| 75 | $Co^{2+}$ | " | $CH_3$ | " | 1/1 | brown |
| 76 | $Ni^{2+}$ | =C(CN)(CONH-C₆H₅) | $CH_3$ | " | 1/1 | red |
| 77 | $Cu^{2+}$ | " | $CH_3$ | " | 1/1 | red |
| 78 | $Ni^{2+}$ | =C(CN)(CONH-C₆H₄-Cl) | $CH_3$ | " | 1/1 | reddish brown |
| 79 | $Cu^{2+}$ | " | $CH_3$ | " | 1/1 | reddish brown |
| 80 | $Ni^{2+}$ | =C(CN)(benzimidazolyl) | $CH_3$ | " | ½ | reddish brown |
| 81 | $Cu^{2+}$ | " | $CH_3$ | " | 1/1 | brown |
| 82 | $Ni^{2+}$ | acetoacetanilide-type | $CH_3$ | " | 1/1 | claret |
| 83 | $Cu^{2+}$ | " | $CH_3$ | " | 1/1 | violet |

TABLE III-continued
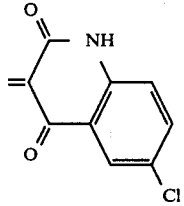
| Example | $M_1^{2+}$ | Y | $R_3$ | 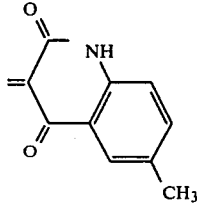 | $M_1/L$ | Shade in PVC |
|---|---|---|---|---|---|---|
| 84 | $Ni^{2+}$ | 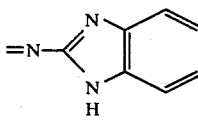 | $CH_3$ | " | 1/1 | red |
| 85 | $Cu^{2+}$ | " | $CH_3$ | " | 1/1 | violet |
| 86 | $Ni^{2+}$ | 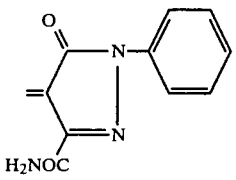 | $CH_3$ | " | 1/1 | violet |
| 87 | $Cu^{2+}$ | " | $CH_3$ | " | 1/1 | claret |
| 88 | $Ni^{2+}$ | 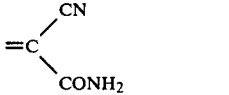 | $CH_3$ | " | ½ | yellow |
| 89 | $Cu^{2+}$ | " | $CH_3$ | " | ½ | yellow |
| 90 | $Cu^{2+}$ | 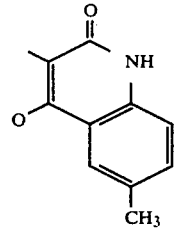 | $CH_3$ | " | 1/1 | brown |
| 91 | $Ni^{2+}$ | 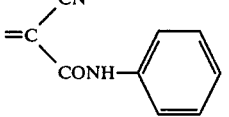 | $CH_3$ |  | 1/1 | red |
| 92 | $Cu^{2+}$ | " | $CH_3$ | " | 1/1 | brown |
| 93 | $Ni^{2+}$ |  | $CH_3$ | " | 1/1 | red |
| 94 | $Cu^{2+}$ | " | $CH_3$ | " | 1/1 | reddish brown |

TABLE III-continued

[Structure: general formula showing M₁ complex with N—N, R₃, C=, A, O, and Y substituents on phenyl ring]

| Example | $M_1^{2+}$ | Y | $R_3$ | A (O⁀⁀⁀) | $M_1/L$ | Shade in PVC |
|---|---|---|---|---|---|---|
| 95 | $Ni^{2+}$ | [=C with C(=O)NH-phenyl-C(=O) cyclic structure] | $CH_3$ | " | 1/1 | claret |
| 96 | $Cu^{2+}$ | " | $CH_3$ | " | 1/1 | red |
| 97 | $Ni^{2+}$ | =C(CN)(CONH₂) | $CH_3$ | [structure: methyl-C(=O), C=, C-O with NH-phenyl-Cl] | 1/1 | yellowish orange |
| 98 | $Cu^{2+}$ | " | $CH_3$ | " | 1/1 | yellow |
| 99 | $Ni^{2+}$ | [=C with C(=O)NH-phenyl-C(=O) cyclic structure] | $CH_3$ | " | 1/1 | red |
| 100 | $Cu^{2+}$ | " | $CH_3$ | " | 1/1 | red |
| 101 | $Ni^{2+}$ | =N—NH—C(=O)—phenyl | $CH_3$ | [structure: methyl-C(=O), C=, C-O with NH-phenyl] | 1/1 | brown |
| 102 | $Cu^{2+}$ | " | $CH_3$ | " | 1/1 | brown |

EXAMPLES 103–107

The 1:1 copper (II) complexes of the formula given below, in which $X_1$ and $X_2$ have the meanings given in the Table, are synthesised according to the process of Example 42. The starting materials are known or they can be manufactured by known methods.

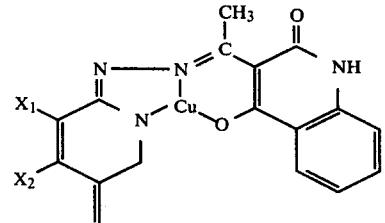

| Example | $X_1$ $X_2$ | Shade in PVC |
|---|---|---|

| | | |
|---|---|---|
| 103 | 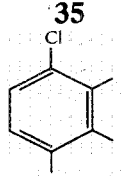 | yellowish brown |
| 104 | 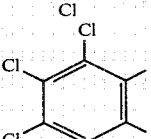 | brown |
| 105 | 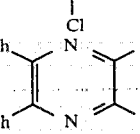 | brown |
| 106 | 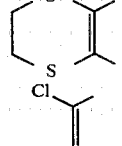 | reddish brown |
| 107 | 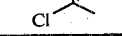 | yellowish brown |

EXAMPLE 108

A fine suspension of 6.62 g (0.02 mole) of the bishydrazone I (prepared by known methods from 3-formyl-2,4-dihydroxyquinoline, hydrazine and 1,3-diimino-isoindoline) of the formula

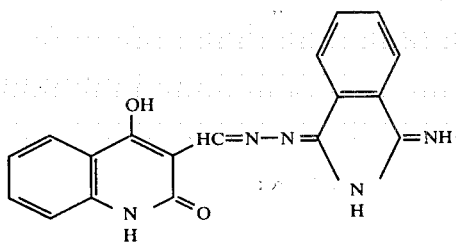

I (only one of the possible isomeric or tautomeric forms has been considered) and 2.56 g (0.02 mole) of barbituric acid in 200 ml of glacial acetic acid is prepared and stirred for 2 hours at 100° C. The reaction mixture is filtered off hot. The filter residue is thoroughly washed with glacial acetic acid and ethanol and dried at 100° C. in vacuo. Yield: 7.15 g (80.8% of theory) of an orange pigment of the composition $C_{22}H_{14}N_6O_5$ and of the formula Ii

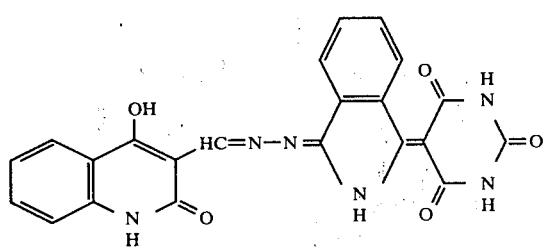

II (only one of the possible isomeric or tautomeric forms has been considered). The reaction of the resultant ligand II with nickel acetate.4H$_2$O (theory+10% surplus) in dimethyl formamide over the course of 4 hours at 110° C. leads to a 1:1 Ni$^{2+}$ complex of the composition $C_{22}H_{12}N_6NiO_5$ (% Ni est. 11.8; found 11.8). This pigment colours PVC and lacquers in red shades of excellent fastness to migration, light and weathering. The metallising can also be effected simultaneously during the condensation of I with barbituric acid.

The 1:1 metal complexes of the formula given below (for simplicity's sake only one of the possible isomeric or tautomeric forms has been considered), in which $M_1$ and $R_3$ have the meanings indicated in Table IV, are synthesised according to the process of Example 108. The starting materials can be manufactured by known methods.

TABLE IV

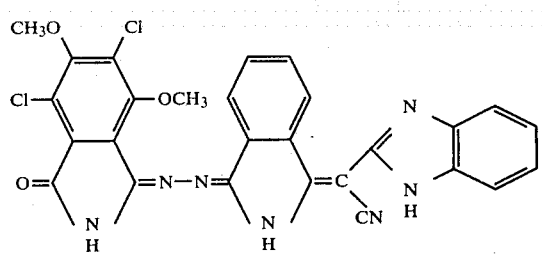

| Example | $M_1^{2+}$ | $R_3$ | Shade in PVC |
|---|---|---|---|
| 109 | Cu$^{2+}$ | H | brown |
| 110 | Ni$^{2+}$ | CH$_3$ | reddish brown |
| 111 | Cu$^{2+}$ | CH$_3$ | yellowish brown |

EXAMPLE 112

1:1 Ni$^{2+}$ complex of

For simplicity's sake only one of the possible isomeric or tautomeric forms has been considered.

Manufacture of the Ligand

A mixture of 5.7 g (0.02 mole) of 1-(cyano-benzimidazolylmethylene)-3-imino-isoindoline and 5.8 g (0.02 mole) of 4,6-dichloro-3,5-dimethoxy-isoindolin-1-on-3-ylidene-hydrazine is heated in 250 ml of glacial acetic acid for 20 minutes to 80° C. The red pigment is filtered off hot, washed with glacial acetic acid and alcohol and dried at 80° C. in vacuo. Yield: 8.7 g (78% of theory) of a product of the above formula which analysis shows to be pure.

Manufacture of the Ni$^{2+}$ Complex 1.68 g (0.003 mole) of the bishydrazone are suspended in 50 ml of methyl cellosolve and the suspension, together with 0.75 g (0.003 mole) of nickel acetate.4H$_2$O, is heated for 4 hours to 100° C. The red suspension is filtered off hot and the filter product is thoroughly washed with methyl cellosolve, alcohol and acetone and dried at 100° C. in vacuo. Yield: 1.55 g (84% of theory) of a pigment of the composition $C_{27}H_{15}Cl_2N_7NiO_3$. This pigment colours PVC and lacquers in brilliant red shades of excellent fastness to light and migration.

By analogous methods metal complexes are manufactured with the ligands of the formula

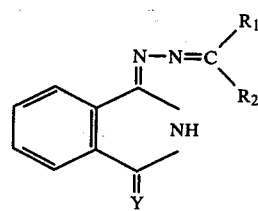

wherein $M_1$, Y, $R_1$ and $R_2$ have the meanings given in Table II. Column 5 indicates the ratio of metal to ligand.

| Example | $M_1^{2+}$ | Y | $=C\begin{smallmatrix}R_1\\R_2\end{smallmatrix}$ | $M_1/L$ | Shade in PVC |
|---|---|---|---|---|---|
| 113 | $Cu^{2+}$ | =C(CN)-benzimidazole | Cl, CH₃O, CH₃O, Cl-phenyl with NH, C=O | 1/1 | red |
| 114 | $Co^{2+}$ | " | " | 1/1 | reddish brown |
| 115 | $Ni^{2+}$ | =C(CN)-5,6-dichlorobenzimidazole | " | 1/1 | reddish brown |
| 116 | $Cu^{2+}$ | " | " | 1/1 | brown |
| 117 | $Ni^{2+}$ | =C(CN)-benzimidazole | tetrachlorophenyl with NH, C=O | 1/1 | red |
| 118 | $Cu^{2+}$ | " | " | 1/1 | red |
| 119 | $Co^{2+}$ | =C(CN)-benzimidazole | tetrachlorophenyl with NH, C=O | 1/1 | claret |
| 120 | $Ni^{2+}$ | " | phenyl with NH, C=O | 1/1 | reddish brown |
| 121 | $Cu^{2+}$ | " | " | 1/1 | brown |
| 122 | $Co^{2+}$ | " | " | 1/1 | brown |
| 123 | $Ni^{2+}$ | =C(CN)(CONH₂) | Cl, CH₃O, CH₃O, Cl-phenyl with NH, C=O | 1/1 | orange |
| 124 | $Cu^{2+}$ | " | " | 1/1 | yellow |

-continued

| Example | $M_1^{2+}$ | Y | $=C\begin{matrix}R_1\\R_2\end{matrix}$ | $M_1/L$ | Shade in PVC |
|---|---|---|---|---|---|
| 125 | Ni²⁺ | =C(CN)₂ | (3,5-dichloro-2,4-dimethoxyphenyl acetamido ethylidene) | 1/1 | brown |
| 126 | Cu²⁺ | " | " | 1/1 | brown |
| 127 | Ni²⁺ | =C(CN)(CONH₂) | (indolin-2-one-3-ylidene) | ½ | red |
| 128 | Cu²⁺ | " | " | ½ | reddish brown |
| 129 | Ni²⁺ | =C(CN)(benzimidazol-2-yl) | (3,4,6-trichloro-5-methoxyphenyl acetamido ethylidene) | 1/1 | red |
| 130 | Cu²⁺ | " | " | 1/1 | brown |
| 131 | Ni²⁺ | =C(CN)(5-methylbenzimidazol-2-yl) | (3,4,5,6-tetrachlorophenyl acetamido ethylidene) | 1/1 | red |
| 132 | Cu²⁺ | " | " | 1/1 | brown |
| 133 | Ni²⁺ | " | (3,6-dichloro-4,5-dimethoxyphenyl acetamido ethylidene) | 1/1 | red |
| 134 | Cu²⁺ | " | " | 1/1 | red |
| 135 | Ni²⁺ | " | (3,4,6-trichloro-5-phenoxyphenyl acetamido ethylidene) | 1/1 | red |
| 136 | Cu²⁺ | " | " | 1/1 | reddish brown |
| 137 | Ni²⁺ | =C(CN)(5,6-dichlorobenzimidazol-2-yl) | (3,4,5,6-tetrachlorophenyl acetamido ethylidene) | 1/1 | reddish brown |
| 138 | Cu²⁺ | " | " | 1/1 | brown |
| 139 | Cu²⁺ | (2-oxo-1,2-dihydroquinolin-3-ylidene type) | (3,6-dichloro-4,5-dimethoxyphenyl acetamido ethylidene) | 1/1 | brown |

EXAMPLE 140

A mixture of 5.7 g (0.02 mole) of 1-(cyano-benzimidazolylmethylene)-3-iminoisoindoline, 5.8 g (0.02 mole) of 4,6-dichloro-3,5-dimethoxy-isoindolin-1-on-3-ylidene-hydrazine and 5.0 g (0.02 mole) of nickel acetate.4H₂O is heated in 250 ml of glacial acetic acid for 4 hours to 100° C. The red suspension is filtered off hot and the filter residue is thoroughly washed with glacial acetic acid, alcohol and acetone and dried in vacuo at 100° C. A pigment of similar properties as in Example 112 is obtained.

EXAMPLE 141

5.7 g (0.02 mole) of 1-(cyano-benzimidazolyl-methylene)-3-imino-isoindoline and 5.0 g (0.02 mole) of nickel acetate.4H₂O are reacted for 30 minutes at 50° C. in 250 ml of glacial acetic acid. Then 5.8 g (0.02 mole) of 4,6-dichloro-3,5-dimethoxyisoindolin-1-on-3-ylidene-hydrazine are added and the suspension is heated for 4 hours to 100° C. The red suspension is filtered off hot and the filter residue is thoroughly washed with glacial acetic acid, alcohol and acetone and dried in vacuo at 100° C. A pigment of similar properties as in Example 112 is obtained.

EXAMPLE 142

A mixture of 10 g of titanium dioxide and 2 g of the pigment manufactured according to Example 1 is ground for 48 hours in a ball mill with 88 g of a mixture of coconut alkyl resin, 24 g of melamine/formaldehyde resin (50% solids content), 8,8 g of ethylene glycol monomethyl ether and 28.8 g of xylene.

By spraying this lacquer onto a aluminium sheet, predrying it for 30 minutes at room temperature and then stoving it for 30 minutes at 120° C. there is obtained a scarlet finish which is characterised by very good fastness to overstripe bleeding, light and weathering.

We claim:

1. An azomethine metal complex of the formula

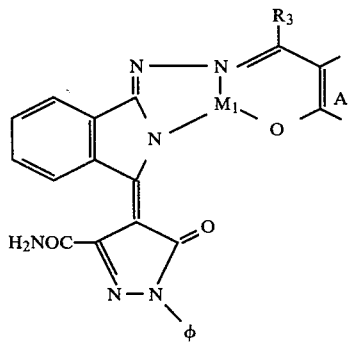

in which $R_3$ is alkyl of 1 to 4 carbon atoms, $M_1$ is Ni, Cu, Co or Zn, A is a radical for the formulae

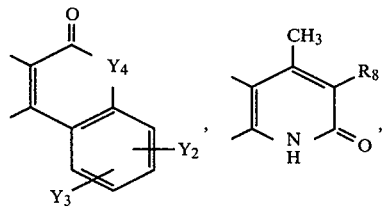

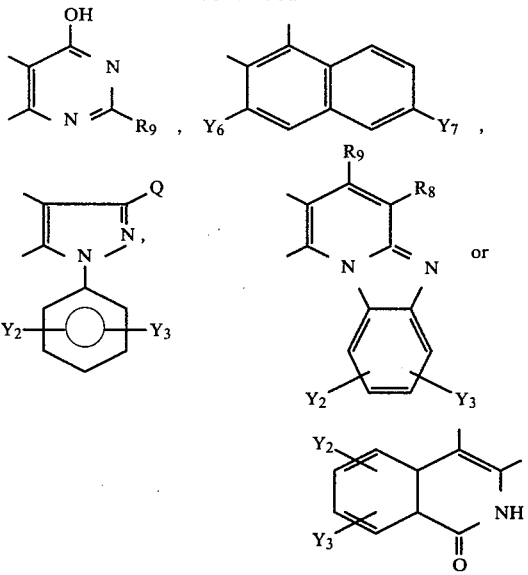

in which Q is methyl, alkoxycarbonyl with 2 to 5 carbon atoms or carbamoyl, $R_8$ is cyano, or carbamoyl, $R_9$ is hydrogen, or hydroxy, $Y_2$ and $Y_3$ are hydrogen, halogen, alkyl of 1 to 4 carbon atoms, alkoxy of 1 to 4 carbon atoms, or nitro, $Y_4$ is —NH—, $Y_6$ is hydrogen, carboxy, carbamoyl, alkoxycarbamoyl of 2 to 6 carbon atoms, alkylcarbamoyl of 2 to 6 carbon atoms, phenylcarbamoyl, phenylcarbamoyl substituted in the phenyl moiety by halogen, alkyl of 1 to 4 carbon atoms, or alkoxy of 1 to 4 carbon atoms, $Y_7$ is hydrogen, halogen, methoxy, nitro or cyano.

2. An azomethine metal complex according to claim 1 of the formula

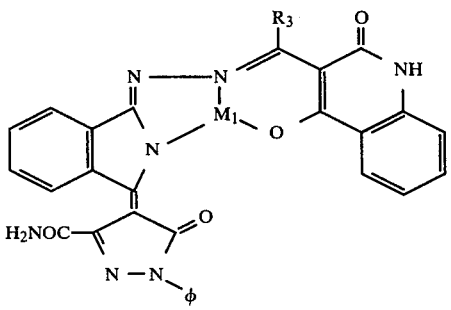

wherein $R_3$ is methyl; and $M_1$ is Cu.

3. An azomethine metal complex of the formula

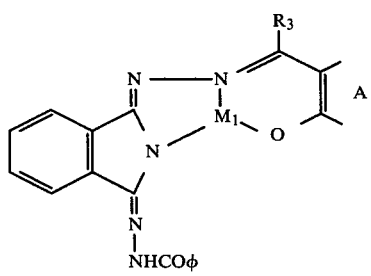

in which $R_3$ is alkyl of 1 to 4 carbon atoms, $M_1$ is Ni, Cu, Co or Zn, A is a radical of the formulae

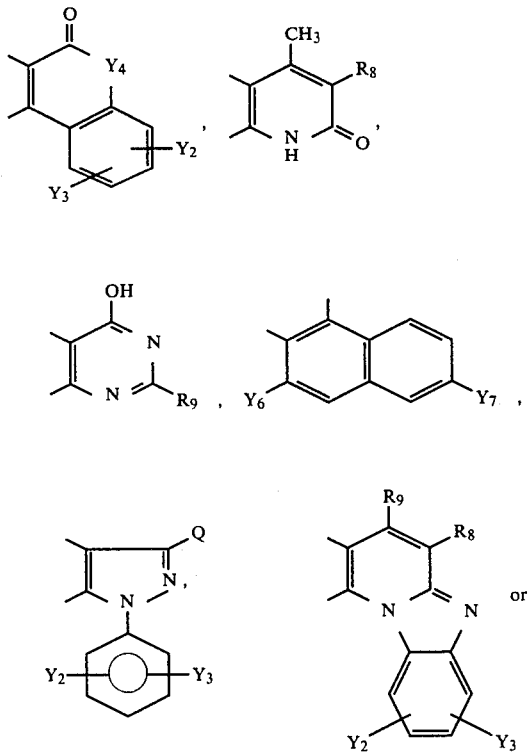

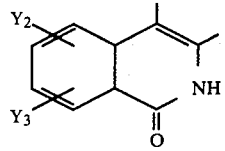

in which Q is methyl, alkoxycarbonyl with 2 to 5 carbon atoms or carbamoyl, $R_8$ is cyano, or carbamoyl, $R_9$ is hydrogen, or hydroxy, $Y_2$ and $Y_3$ are hydrogen, halogen, alkyl of 1 to 4 carbon atoms, alkoxy of 1 to 4 carbon atoms, or nitro, $Y_4$ is —NH—, $Y_6$ is hydrogen, carboxy, carbamoyl, alkoxycarbamoyl containing 2 to 6 carbon atoms, alkylcarbamoyl containing 2 to 6 carbon atoms, phenylcarbamoyl, phenylcarbamoyl substituted in the phenyl moiety by halogen, alkyl of 1 to 4 carbon atoms, or alkoxy of 1 to 4 carbon atoms, $Y_7$ is hydrogen, halogen, methoxy, nitro or cyano.

4. An azomethine metal complex according to claim 3 of the formula

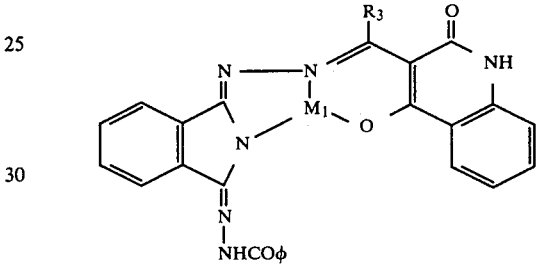

wherein $R_3$ is methyl; and $M_1$ is Ni or Cu.

* * * * *